G. L. PATTERSON & G. H. HOPPER.
BATTERY.
APPLICATION FILED OCT. 16, 1908.
924,575.
Patented June 8, 1909.
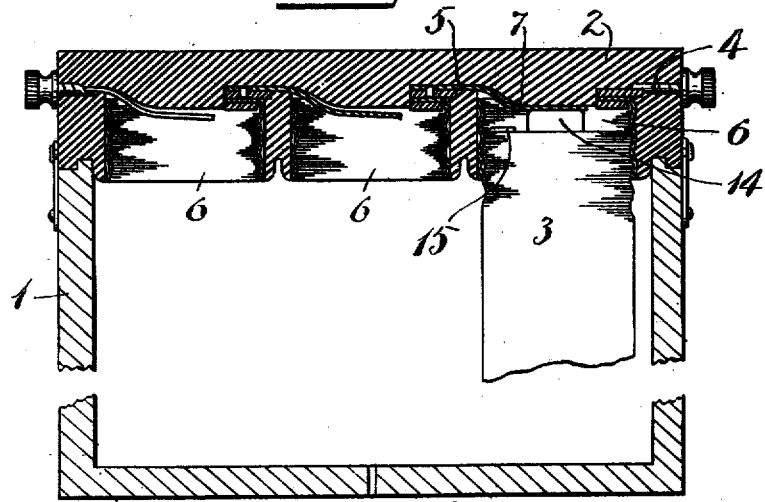
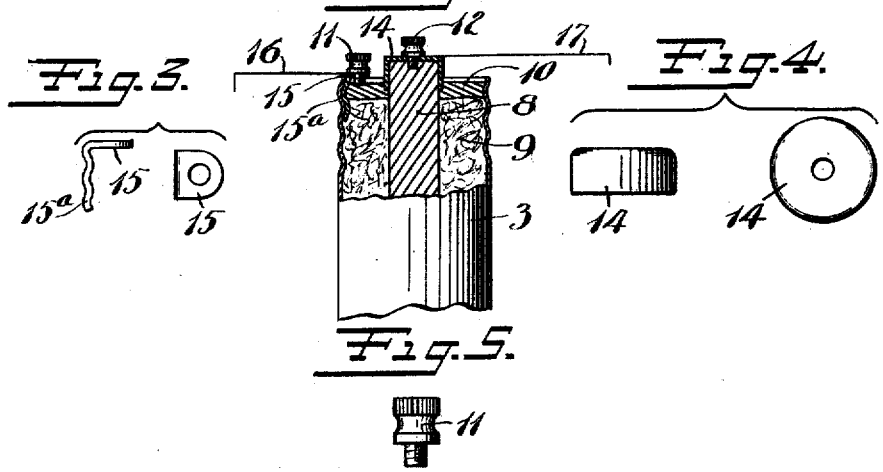
Witnesses:
Fred M. Dannenfelser
Ida M. Hunziker
Inventors
G. L. Patterson & G. H. Hopper.
By their Attorneys

UNITED STATES PATENT OFFICE.

GEORGE L. PATTERSON, OF NEW YORK, AND GEORGE H. HOPPER, OF BROOKLYN, NEW YORK, ASSIGNORS TO ALICE C. PATTERSON, OF NEW YORK, N. Y.

BATTERY.

No. 924,575.     Specification of Letters Patent.     Patented June 8, 1909.

Application filed October 10, 1908. Serial No. 457,994.

*To all whom it may concern:*

Be it known that we, GEORGE L. PATTERSON and GEORGE H. HOPPER, citizens of the United States, residing at New York, county and State of New York, and Brooklyn, Kings county, New York, respectively, have invented certain new and useful Improvements in Batteries, of which the following is a full, clear, and exact description.

Our invention relates to improvements in batteries and particularly to those of the so-called "dry battery" type.

The invention is essentially an improvement upon the battery construction set forth and claimed in the Gill patent No. 705,919 of July 29, 1902.

The main object of this invention is to improve a battery of the type set forth in the said patent, and referred to as a battery of the "socket" type, so that it is readily convertible into a battery of the well known "binding-post" type, this end being accomplished in a very simple, inexpensive and effective manner, without in any way impairing the efficiency and operativeness of the battery when it is to be employed as a "socket" battery.

In the accompanying drawings, Figure 1 is a side elevation of our improved battery, said view being partly in section, one cell only being shown in place. Fig. 2 is a side elevation, partly in section, of a single cell when used after the manner of the ordinary dry-battery cell of the "binding-post" variety. Fig. 3 illustrates one detail of construction. Fig. 4 illustrates another detail of construction. Fig. 5 still another detail of construction.

1 represents a case, box or receptacle, intended to protect one or more cells.

2 represents what we may term the socket element, in this instance operating as a cover for the box and being adapted to hold three cells. In this particular construction, the socket element 2 is provided with three internally threaded socket pieces 6—6—6 arranged to receive as many cells.

4 represents an outgoing terminal connector for one of the socket pieces 6. 5 represents the incoming terminal connector for said socket. In this instance, the terminal 5 is provided with the integral contact piece 7.

Any desired number of socket pieces may be provided, it being sufficient herein to describe only one.

The cell 3 comprises a cupped external part constituting one electrode, a carbon stick 8 contained therein and constituting the opposite electrode, and a suitable electrolyte 9 surrounding said stick.

10 represents a washer of suitable material to seal in the cell.

In the ordinary use of the battery cell as herein described, the same operates substantially as set forth in the Gill patent, it requiring merely the screwing in of the cell 3 to the socket piece 6 to secure the cell in place and at the same time to put the two electrodes of the cell in operative electrical connection with the socket terminals.

It will be observed that thus far no binding posts have been referred to whereby the cell might be employed after the manner of an ordinary cell of the binding post variety, but inasmuch as it sometimes happens that the user is not provided with a socket arranged to take a cell of this type, it is desirable that such cells be so constructed that they may be quickly and advantageously used after the manner of the ordinary dry battery cell of the binding post variety. To so construct the socket cell that it has this universal adaptability, it is necessary to provide a construction which will not impair or interfere with the cell when it is to be used as a cell of the socket type. Obviously, if the cell were provided with the usual rigid binding post, it could not be used as a socket cell inasmuch as the rigid binding posts would so disturb the proportions and so interfere with the assembling of the cell in the socket as to prevent such use. We have therefore devised the following improvements which consist particularly in providing detachable connecting members to perform the function of binding posts so far as involves the connecting of wires to the cell, which means will not interfere with the operation or use of the cell when used with a socket holder. This improvement is provided at a minimum expense and yet is of the utmost durability and effectiveness. The detachable wire connecting means are respectively indicated at 11 and 12 and each comprises a head having a projected threaded stem, whereby the same may be mechanically and electrically connected to the cell. In this particular instance, the connector 12 is adapted to be screwed into a threaded opening in the end of a metallic cap 14, carried by the outer end of the carbon electrode 8. This cap 14 constitutes the terminal end of the carbon electrode, whether the cell is to be used as one of the socket type or the binding post type. The other wire connector 11 is adapted to screw into a threaded opening in a terminal piece 15 which stands within the cupped portion of the cell 3 and about flush with the upper end thereof, as best seen in Fig. 2. It is also desirable that the same should be preferably located in a plane slightly below the upper end of the terminal cap 14 so that by no possibility will it interfere with the insertion of the cell in a socket when said cell is to be employed with such socket. The piece 15 is electrically connected with the cupped electrode of the battery and to provide a superior electrical connection, and at the same time, to improve the mechanical efficiency of the connection, we corrugate that portion (15ª) of the piece 15 so that it will correspond with the internally threaded upper end of the cell. By this means a more extensive area is provided than were a flat piece employed. Furthermore, when the sealing washer 10 is in place, the corrugations engaging in the thread serve to interlock the parts and prevent accidental disengagement. Of course the part 15ª may be actually soldered or otherwise rigidly connected with the cupped portion of the cell if desired, before the sealing material is introduced, but broadly speaking, this is unnecessary.

Whenever it is desired to use the battery cell after the manner of a cell of the binding post variety, the end of each circuit wire (indicated at 16 and 17) may be attached in the usual manner by simply bending an eye at the end of each wire and connecting it to its proper electrode by means of one of the detachable binding posts 11 or 12. Whenever it is desired to use the cell after the manner of a socket cell, the members 11 and 12 are easily and quickly removed, leaving the upper ends of the cell unobstructed and ready for insertion in the socket.

From the foregoing it will be seen that by no chance will the consumer be embarrassed by reason of any inability to procure at a supply house battery cells of the particular type for which he is equipped, since the socket cells thus improved are of universal adaptability.

It will be observed that when the cell is to be inserted in the socket, it is of the utmost importance that there be no projection on the outer side or upon that side where engagement is to occur, which will interfere in any way therewith. To that end in the particular form shown, the piece 15 and its extension 15ª is wholly within the cupped portion of the cell, leaving the external threaded portion entirely free. In the ordinary binding post, such as found on dry batteries, the binding post proper, to wit: the screw threaded shank upon which the ordinary binding nut fits, is a rigid part of the cell always projecting therefrom. In the present instance the post element is the screw threaded extension from the head of the part 11 or 12. We have found by this simple arrangement that new and unforeseen advantages are attainable, particularly in the combination herein disclosed.

While we have shown our invention in the preferred form, it should be understood that many modifications may be made.

What we claim is:

1. In a battery cell of the so-called "dry-battery" type, a cupped member constituting one electrode, a second electrode contained within the same, the former having a terminal arranged wholly at its inner side, a binding piece carried thereby, and a socket arranged to hold said cell by mechanical and electrical engagement with said electrode.

2. In a battery cell of the so-called "dry-battery" type, a cupped member constituting one electrode, a second electrode contained within the same, the former having an inwardly projecting terminal and a binding piece adapted to be carried thereby, said terminal comprising a plate, one part of which is in electrical connection with said cupped portion, another part of which is arranged to receive and carry said removable binding piece.

3. In a battery cell of the so-called "dry-battery" type, a cupped portion constituting one electrode a second electrode contained within the same and exposed at the one end of the cell, said cupped portion being threaded externally and internally at its open end, a terminal piece comprising a plate having a corrugated portion corresponding substantially to the cross sectional outline of the internal threads and adapted to engage therewith and means to hold said piece in electrical contact therewith.

4. In a battery cell of the so-called "dry-battery" type, a cupped portion constituting one electrode, a second electrode contained within the same and exposed at one end of the cell, the cupped portion being externally and internally threaded at its open end, a terminal portion comprising a plate having a corrugated portion corresponding substantially to the cross sectional outline of the thread and adapted to engage therewith and means to hold the said plate in electrical contact therewith, said holding means comprising a washer arranged to seal in said cup around said second electrode.

5. As an article of manufacture, a battery cell of the socket type comprising a cell having a socket connection at one end thereof, and a non-interfering binding post at the same end whereby said cell may be used either as a socket cell or as one of the binding post variety.

6. In a battery, a socket and two terminal pieces attached thereto in combination with a battery cell fitting said socket and having electrodes adapted to make contact with said socket terminals respectively, and means for securing one end of said cell in said socket, and means at the same end of said cell for detachably securing circuit wires thereto when said cell is removed from said socket.

7. In a battery, a socket and two terminal pieces attached thereto in combination with a battery cell fitting said socket and having electrodes adapted to make contact with said socket terminals respectively, and means for securing one end of said cell in said socket, and means at the same end of said cell for detachably securing circuit wires thereto when said cell is removed from said socket, said last mentioned connecting means comprising screw members arranged to take into screw-threaded openings in said electrodes.

8. As an article of manufacture, a battery cell of the socket type comprising a cup constituting one electrode of said cell, said cup having a socket connection at one end thereof, a non-interfering binding post carried by said cupped portion whereby said cell may be used either as a socket cell or as one of the binding post variety, a second electrode carried by said cup and having its terminal end arranged substantially at the center of one end thereof and adjacent the first mentioned binding post, and a second binding post for said last mentioned electrode.

GEORGE L. PATTERSON.
GEORGE H. HOPPER.

Witnesses:
R. C. MITCHELL,
ALICE MORFORD.